FIG_1
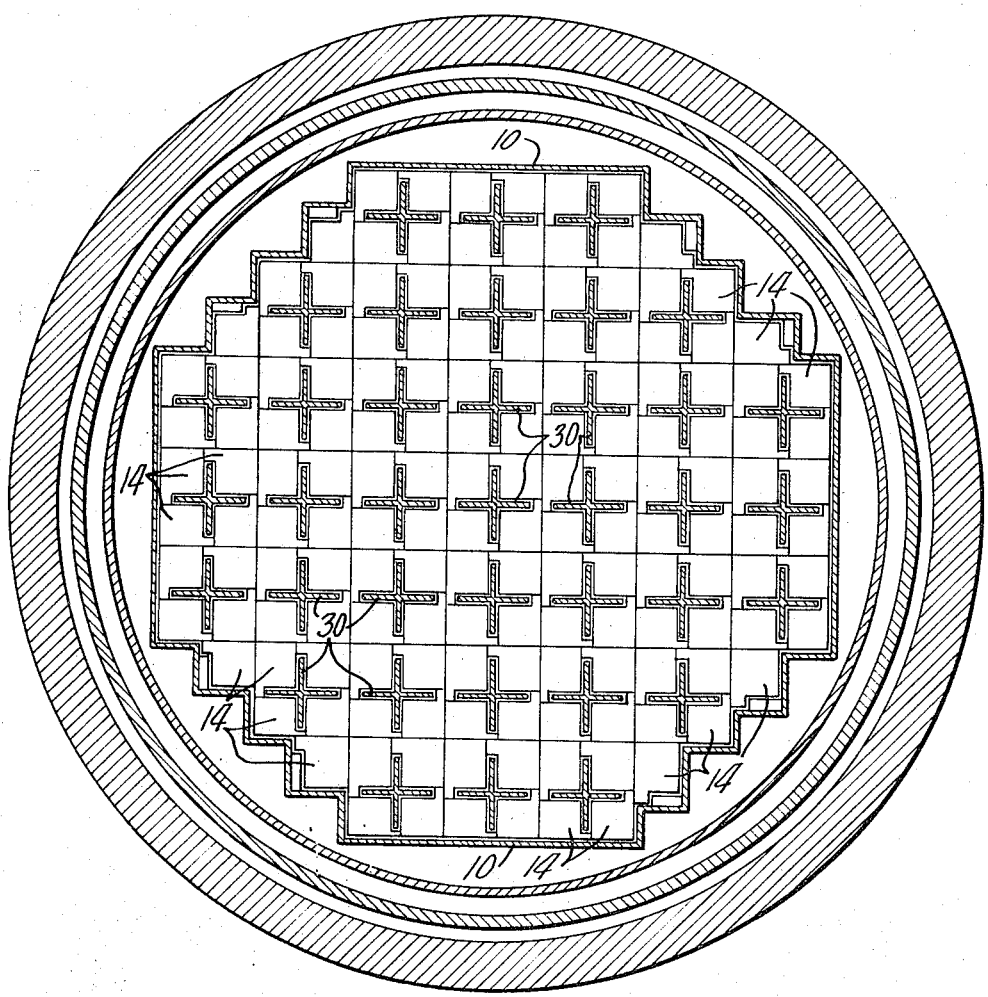

FIG_2
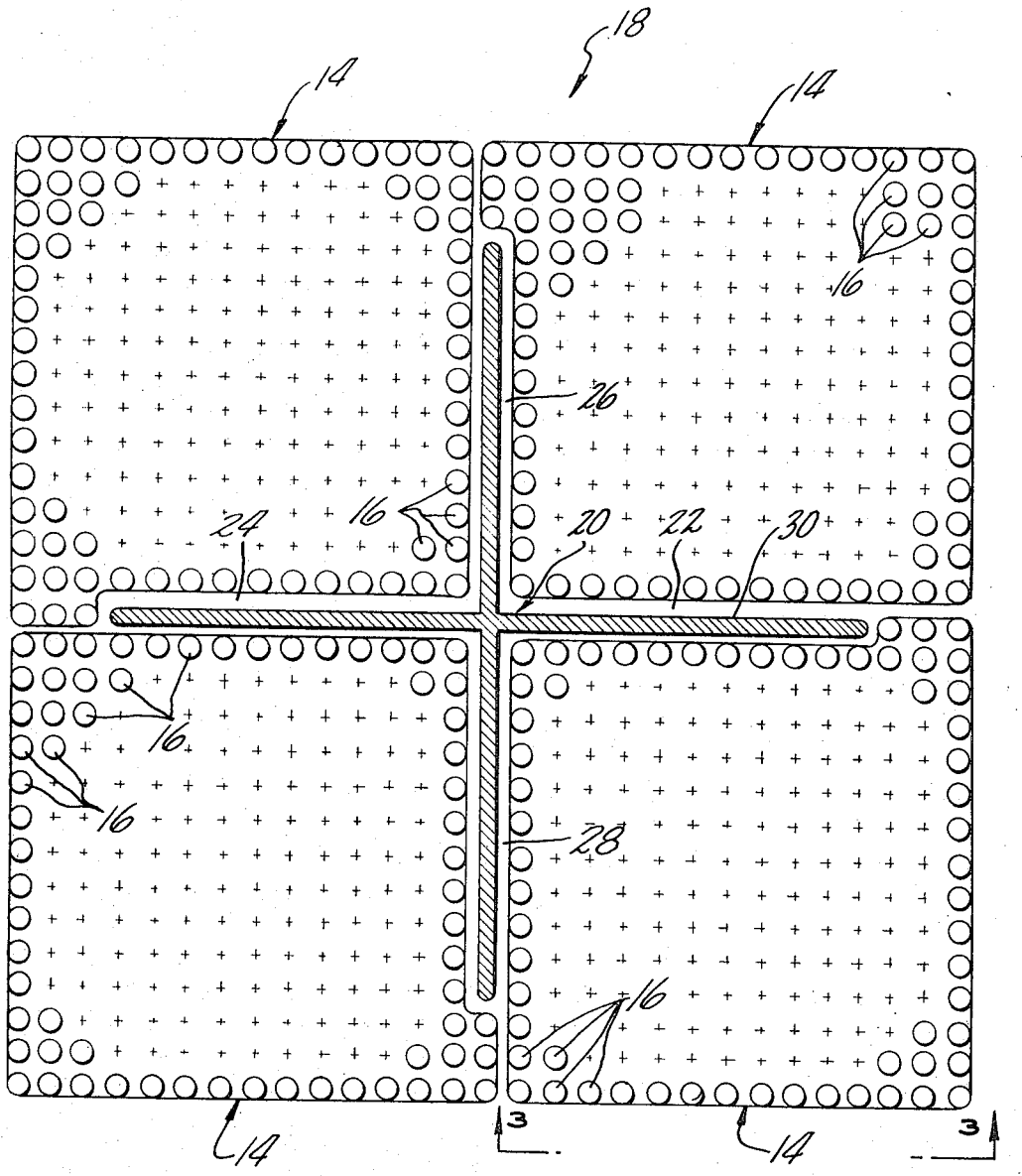

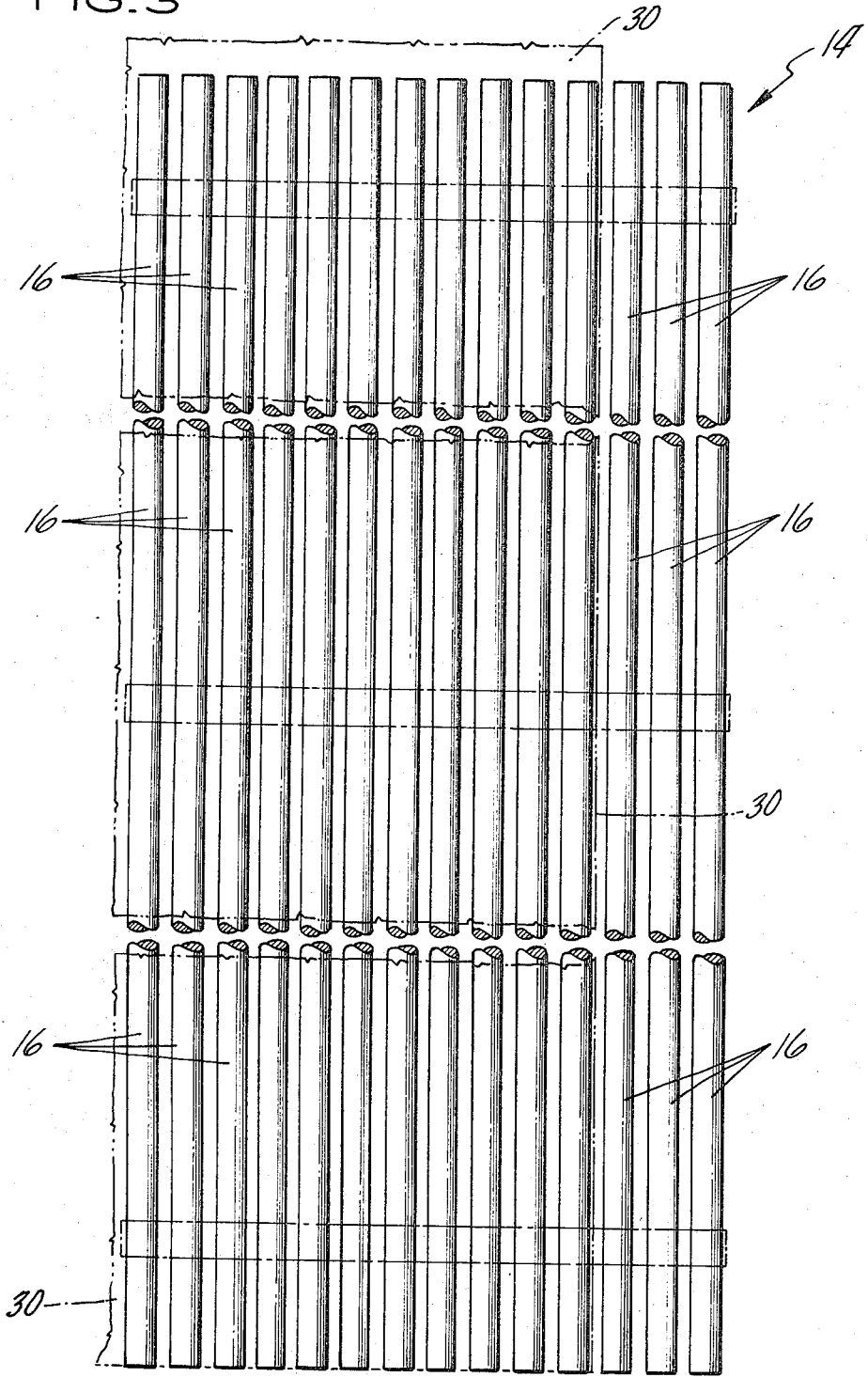

United States Patent Office 3,351,533
Patented Nov. 7, 1967

3,351,533
NUCLEAR REACTOR CORE ORGANIZATION AND FUEL ASSEMBLY THEREFOR
John F. Rohlin, Wapping, Conn., assignor to Combustion Engineering, Inc., Windsor, Conn., a corporation of Delaware
Filed Dec. 3, 1964, Ser. No. 415,698
1 Claim. (Cl. 176—40)

This invention relates generally to nuclear reactors of the heterogeneous type employing fuel rods which are retained in a plurality of assemblies with these assemblies being so disposed as to make up the core of the reactor with the invention being particularly concerned with a core of such a reactor which core is comprised of a novel fuel element assembly organization such that all of the assemblies in the core are identical and may be interchanged as desired.

In accordance with the invention the various assemblies that make up the core of the reactor are formed by bundling together fuel rods in such a manner that the rods are in parallel relation and are uniformly spaced throughout the area of the assembly. The transverse configuration of the assembly is square with the exception that on one side of the assembly there is provided what may be termed an extra, partial row of spaced fuel rods. This row extends a short distance from one side of the assembly. With each assembly thus formed the assemblies are disposed within the core of the reactor such as to form a plurality of subassemblies with each subassembly being comprised of four such assemblies. The orientation of the assemblies within the subassemblies is such that there is formed a cruciform passageway for the reception of a control rod with the oppositely extending blades of this cruciform passageway being co-planar so that the blades of the control rod that are to be received within the passageway may also be co-planar. The entire core of the reactor is comprised of these fuel assemblies with each assembly being identical. It is thus necessary to stock in inventory only one fuel assembly configuration, and the assemblies in any portion of the reactor may be substituted for one another or replaced with an assembly of identical construction.

There is thus provided a simple and economic reactor design permitting free interchange of fuel element assemblies and reducing to a minimum the inventory requirements for the reactor.

It is accordingly an object of the invention to provide an improved reactor organization.

It is a further object of the invention to provide an improved heterogeneous reactor having interchangeable fuel assemblies.

A still further object of the invention is to provide a reactor organization with interchangeable assemblies having a transverse configuration other than square or hexagonal and having a portion which, when assembled into the reactor, provides a terminus for the lateral extent of the control rod passageway.

Other and further objects of the invention will become apparent to those skilled in the art as the description proceeds.

With the aforementioned objects in view, the invention comprises an arrangement, construction and combination of the elements of the inventive organization in such a manner as to attain the results desired, as hereinafter more particularly set forth in the following detailed description of an illustrative embodiment, said embodiment being shown by the accompanying drawings wherein:

FIGURE 1 is a horizontal transverse section showing in somewhat diagrammatic form a nuclear reactor embodying the present invention;

FIGURE 2 is a horizontal transverse section of a subassembly of the core of the nuclear reactor of the invention with this subassembly being made up of four fuel assemblies and with there being shown in this view a cruciform control rod positioned in the cruciform passage formed in this subassembly; and FIGURE 3 is an elevational view of the subassembly of FIGURE 2 and is taken generally from line 3—3 of FIGURE 2.

Referring now to the drawing, wherein like reference numerals are used throughout to designate like elements, the illustrative embodiment of the invention as depicted therein includes a nuclear reactor core formed within an elongated shroud 10 with this shroud being positioned within a suitable vessel or housing identified generally as 12. As is conventional, a grid is provided at the upper and lower ends of the shroud 10, this grid not being shown in the accompanying drawing with the purpose of this grid being to retain the fuel assemblies within their proper relation in the core.

There are a large number of fuel assemblies 14 in the reactor core with each of the assemblies, as best depicted in FIGURE 2, being made up of fuel rods or elements 16 which are retained, in any suitable and known manner, in spaced parallel relation. For example, support bars may be positioned tangent to the rods 16 and secured thereto by welding. The fuel rods may be comprised of tubular members of relatively small diameter, such as one half inch, and several feet long and they may be of stainless steel, zirconium or other suitable material and filled with a fissionable material such as uranium oxide with the tubes being sealed at their upper and lower ends.

As embodied in the invention the rods 16 of each of the assemblies 14 are formed in bi-lateral rows (i.e. rows extending in two directions) with the rows being oriented at 90° to each other. The transverse section of each assembly 14 is square with the exception that there is a partial row (17) of rods at one side of the assembly and which extends from one edge of the assembly. This, in effect, is an extra row of rods with the cross-section of the assembly, except for this extra partial row 17, being square. In the illustrative embodiment there are 14 rods in each of the rows with the exception of the rows which contain the rods that make up the partial row 17.

In the illustrative embodiment the fuel rods may be approximately .48 inch in diameter and disposed in an array such that their centers are spaced at approximately .66 inch.

Each of the assemblies 14 is of the same configuration and the same dimension and while the partial row 17, in the illustrative arrangement, has been shown as containing three fuel rods, the exact number of rods in this partial row may vary in accordance with the design and physics of the particular reactor. With this particular configuration any of the fuel assemblies throughout the reactor core may be interchanged and replaced as desired, and it is necessary to have in inventory only one specific design of fuel assembly.

Within the reactor core the assemblies are formed into subassemblies 18 each of which is comprised of four assemblies 14 oriented so as to form within the subassembly a cruciform passageway 20 for reception of a cruciform control rod. The opposed legs 22 and 24 of the passageway 20 are co-planar as are the opposed legs 26 and 28. As shown in FIGURES 1 and 2 there is provided within the cruciform passageway 20 a cruciform control rod 30 which is vertically movable into and out of the passageway for the purpose of controlling the output of the reactor as is well known.

The arrangement of the core is such that a coolant, such as water, is passed through the core and over the rods 16 with heat being imparted to the coolant and with the coolant being conveyed from the core for use as desired during operation of the reactor.

With the novel core design and fuel assembly configuration of the invention, interchangeability of assemblies throughout the core is achieved and at the same time a simple cruciform configuration for the control rod is provided with the opposed blades being in co-planar relation such that the difficulties in fabricating the control rod may be maintained at a minimum, close tolerances achieved and water gap effect reduced.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

In a nuclear reactor core the combination of a plurality of elongated fuel assemblies retained in parallel side-by-side relation to form the core, each assembly being comprised of elongated parallel fuel rods retained in evenly spaced relation and arranged in a first group of parallel rows and a second group of parallel rows oriented at right angles to the first group, each of said rows extending across the entire width of the assembly with the exception of one outer row which extends from one edge of the assembly only a minor portion of the width of the assembly; there being the same number of rows in each direction with the exception of said partial row which is an additional row, the core including groups of four of the assemblies formed into subassemblies and oriented so that a cruciform passageway is formed centrally of the subassemblies with oppositely extending arms of the cruciform configuration being co-planar.

References Cited

UNITED STATES PATENTS

| | | | |
|---|---|---|---|
| 2,982,713 | 5/1961 | Sankovich et al. | 176—78 |
| 2,992,982 | 7/1961 | Avery | 176—18 |
| 3,133,867 | 5/1964 | Frisch | 176—78 |
| 3,182,003 | 5/1965 | Thorp et al. | 176—78 |
| 3,211,621 | 10/1965 | Creagan | 176—78 |
| 3,235,463 | 2/1966 | Sankovich | 176—78 |

L. DEWAYNE RUTLEDGE, *Primary Examiner.*